United States Patent [19]
Clapp et al.

[11] Patent Number: 5,244,185
[45] Date of Patent: Sep. 14, 1993

[54] RETAINER

[75] Inventors: John M. Clapp; Patrick S. Livingston; Robert E. Geiger, all of Sayre, Pa.

[73] Assignee: Ingersoll-Rand Company, Woodcliff Lake, N.J.

[21] Appl. No.: 894,362

[22] Filed: Jun. 4, 1992

[51] Int. Cl.⁵ ............................................. F16K 1/00
[52] U.S. Cl. .................................. 251/321; 285/276; 285/319
[58] Field of Search ............... 285/276, 316, 319, 321, 285/921; 251/321; 403/326

[56] References Cited

U.S. PATENT DOCUMENTS

| | | | |
|---|---|---|---|
| 794,110 | 7/1905 | McDowell | 285/276 |
| 3,245,703 | 4/1966 | Manly | 285/319 |
| 4,610,468 | 9/1986 | Wood | 285/319 X |
| 4,948,175 | 8/1990 | Bartholomew | 285/319 X |
| 5,033,513 | 7/1991 | Bartholomew | 285/319 X |
| 5,090,748 | 2/1992 | Usui et al. | 285/319 |
| 5,112,084 | 5/1992 | Washizu | 285/319 X |
| 5,163,720 | 11/1992 | Abe | 285/319 |
| 5,167,431 | 12/1992 | Maifreli | 285/319 |

*Primary Examiner*—Dave W. Arola
*Attorney, Agent, or Firm*—Walter C. Vliet

[57] ABSTRACT

A spring clip retainer for securing a spool in a bore in, for example, a power tool wherein the spool forms a swivel connection for a source of pressure fluid to operate and or control the device.

6 Claims, 1 Drawing Sheet

RETAINER

BACKGROUND OF THE INVENTION

This invention relates generally to fluid machines and more particularly to devices for connecting and retaining fluid conduits for fluid machines. Fluid machines commonly require connection to fluid inlets and/or fluid outlet lines. Such connections are usually accomplished by use of threaded adapters or bayonet style quick connectors. In either case an adapter of some sort is threaded into the fluid machine while a mating adapter is attached to the appropriate fluid carrying hose or other conduit.

Where mobility is required, as in the case of fluid powered hand tools, it is desirable to effect a swivel action associated with the connection. In the past this has generally been accomplished external to the fluid machine and/or required complicated internal structure or difficult assembly procedure.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a retainer for a fluid connection device to a fluid machine comprising a spool connector for insertion in a bore in a fluid machine; a retaining clip means engaging the spool connector for rotation thereabouts; and the retaining clip means is further provided with resilient tab means for selected interconnection between the clip means and the bore.

The foregoing and other aspects will become apparent from the following detailed description of the invention when considered in conjunction with the accompanying drawing figures.

BRIEF DESCRIPTION OF THE DRAWINGS

FIG. 1 is a cross sectional view of the retainer according to the present invention showing its interrelationship with a spool connector inserted within a bore in a power tool or the like;

DETAILED DESCRIPTION

Figure 1:
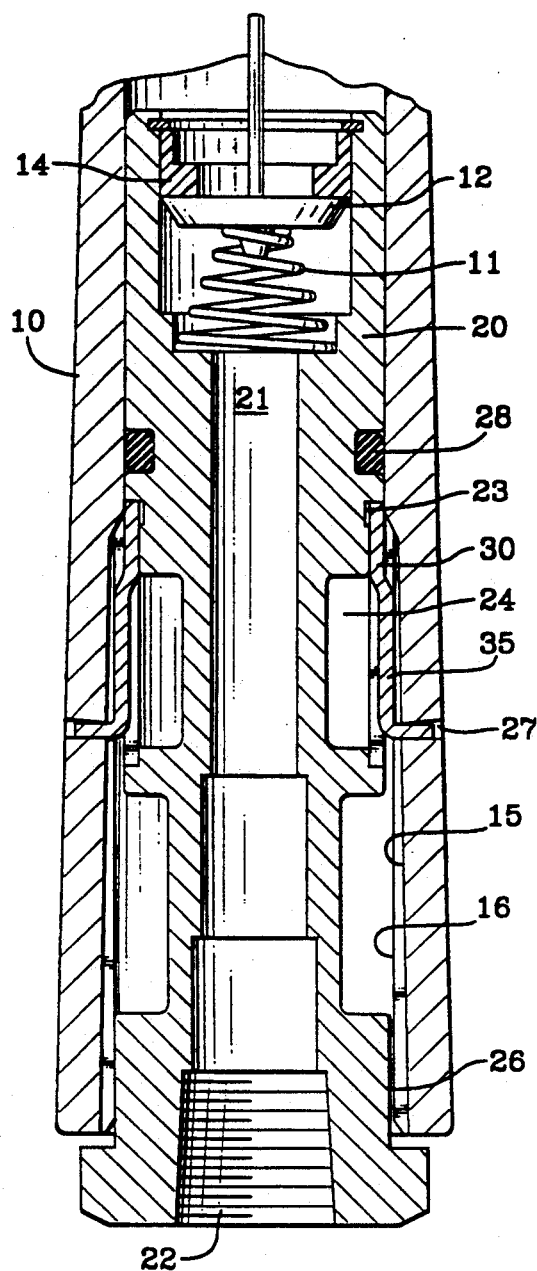

Referring to FIG. 1, the features of a retainer 30 connection to a fluid powered machine or tool 10 are shown. The retainer is interspaced between the power tool 10 and an inlet spool 20 which serves to receive pressure fluid through an inlet threaded connection 22. The pressure fluid is transmitted by means of a fluid channel 21 to a valve bore and therefrom through a valve element 12. The valve element 12 selectively engages valve seat 14 to control fluid flow to a motor means (not shown) associated with the power tool 10.

A spring 11 normally maintains the valve element 12 in close cooperation with the valve seat 14. Tilting the valve element 12 against the spring 11 allows pressure fluid to proceed to the motor means.

The spool 20 which contains both the valve element 12 and the threaded connection 22 is disposed within a bore 15 within the power tool. A guide 16 is provided in the described embodiment which may cooperate with a groove in the spool to accomplish a selective orientation of the spool relative to the bore or simply space the spool in the bore to permit axial access as shown for a purpose later described.

In the event, however, that it is desirable to provide rotation of the spool, the key or spline type feature of the guide 16 is omitted. An "O" ring seal 28 provides sealing engagement between the spool 20 and the power tool bore 15. A bore boss 26 provides reinforcement to the threaded connection 22 and inlet alignment of the spool with the bore.

As best seen in FIG. 1, the spool 20 is further provided with a circumferential recess 23 which receives a retaining clip 30 intermediate the spool 20 and the bore 15. The spool is further provided with a peripheral spool recess 24 intermediate and deeper than clip recess 23 for the purpose of receiving a spring finger 35 disposed on the retaining clip 30 as will be further described.

Figure 2:
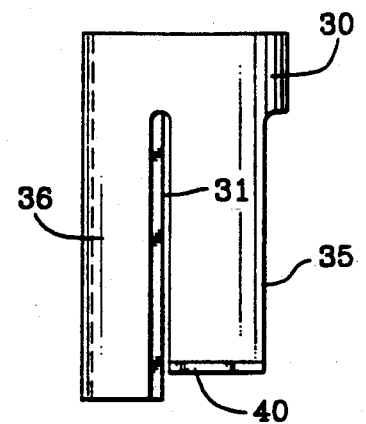
FIG. 2 is a side elevation view of the retaining clip according to the present invention.
Figure 3:
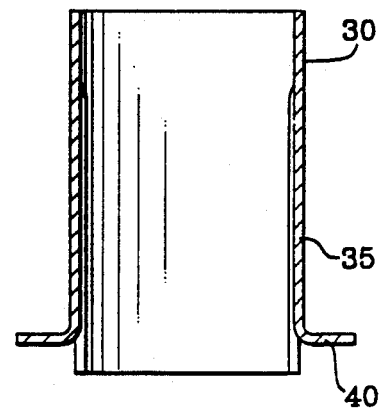
FIG. 3 is a front sectional elevation of the retaining clip according to the present invention taken at Section 3—3 of FIG. 4.
Figure 4:
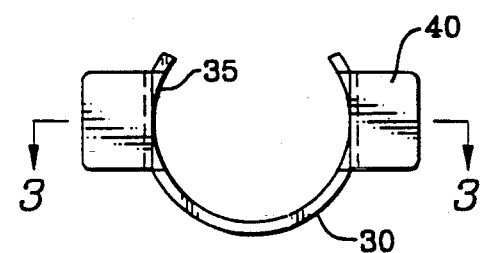
FIG. 4 is a bottom view of the retaining clip showing its semi-circular clip-on construction.

Referring to FIGS. 2–4, the retaining clip according to the present invention is shown in the form of a partial cylinder in excess of 180 degrees of circumference. The retaining clip is manufactured of a resilient material, such as spring steel, and one skilled in the art may appreciate that it may be disposed about the periphery of the spool 20 in the retaining clip recess 23 by simply snapping it in place within the circumferential recess 23 prior to assembly of the spool 20 in the bore 15.

Referring to FIG. 2, the retaining clip 30 is provided with longitudinal slots 31 dividing the retaining clip into a back shell portion 36 comprising a portion of a cylinder and two finger portions 35 extending longitudinally from the body of the clip. Each of the fingers is further provided with a bent tab 40 which in its extended position, as shown in FIG. 1, intercepts a tab slot 27 for purpose of securing the retaining clip relative to the bore 15 and thereby the power tool 10.

As may be appreciated by one skilled in the art, the retaining clip 30 is free to rotate about the spool 20 but is secured from both rotation and translation within the bore 15 by means of the bent tabs 40 coacting with the tab slot 27. It should be also appreciated that the retaining clip is free to rotate within the clip recess 23 and is prevented from longitudinal traverse by the end walls of the clip recess.

For assembly, the retaining clip is expanded and disposed about the spool 20. The spool 20 is then inserted in the bore 15 to the point shown in FIG. 1, where the bent tabs 40 spring outward to intercept the tab slot 27. This secures the retainer clip within the bore and permits only rotation of the spool about the retaining clip 30.

The peripheral spool recess 24 provides relief for the spring finger 35 to be bent inward as shown in phantom on FIG. 1 during assembly. As previously described, rotation of the spool may be prevented by interaction of the bore boss 26 with the guides 16 by providing the bore boss with an interacting spline or the key or the like.

The spool may be removed only after the bent tabs 40 are depressed beyond the tab slot 27. This may be accomplished by an external means comprising a special tool or the like which may access the tool either longitudinally by means of the guide slot 16 or along the exterior of the tab slot 27 to depress the spring finger 35.

Having described the invention, what is claimed is:

1. A retainer for a connection to a fluid powered machine comprising:
    an elongate spool having a pressure fluid connector at one end for connection to a flexible hose and an external operable valve element disposed within its other end for axial insertion in a bore in a fluid machine;
    a retaining clip means for retaining said spool within the bore and engaging said spool connector for rotation thereabouts; and
    said retaining clip means being further provided with resilient tab means for selected interconnection between said clip means and said bore as a means for axial alignment in said bore and for permitting said spool to rotate within said bore relative to said fluid powered machine when connected to said flexible hose.

2. A retainer for a connection to a fluid powered machine according to claim 1, wherein said retaining clip further comprises a partial cylinder spring clip disposed in a circumferential groove on said spool.

3. A retainer for a connection to a fluid powered machine according to claim 2, wherein said retaining clip further comprises a partial cylinder spring clip provided with spring finger means for coacting with said bore to secure said clip from movement in a selected position within said bore.

4. A retainer for a connection to a fluid powered machine according to claim 3, wherein said resilient tab means includes a bent tab provided on said spring finger for protrusion into a recess in said bore.

5. A retainer for a connection to a fluid powered machine according to claim 3, wherein said spring clip is free to rotate about said spool thereby allowing said spool and said connection to rotate within said fluid powered machine.

6. A retainer for a connection to a fluid powered machine according to claim 3, wherein said spring finger is elongate and is longitudinally disposed from said clip.

* * * * *